(12) United States Patent
Shibata et al.

(10) Patent No.: US 9,410,616 B2
(45) Date of Patent: Aug. 9, 2016

(54) SHIFT LEVER POSITION DETERMINATION DEVICE FOR VEHICLE

(71) Applicant: TOYOTA JIDOSHA KABUSHIKI KAISHA, Toyota-shi, Aichi-ken (JP)

(72) Inventors: Hiroshi Shibata, Seto (JP); Taiyo Uejima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/953,844

(22) Filed: Nov. 30, 2015

(65) Prior Publication Data

US 2016/0153547 A1  Jun. 2, 2016

(30) Foreign Application Priority Data

Dec. 2, 2014  (JP) ................................. 2014-243989
Aug. 20, 2015  (JP) ................................. 2015-163271

(51) Int. Cl.
*F16H 59/10* (2006.01)
*F16H 59/02* (2006.01)

(52) U.S. Cl.
CPC .......... *F16H 59/105* (2013.01); *F16H 59/0204* (2013.01)

(58) Field of Classification Search
CPC .................. B60W 2540/16; B60W 2540/165; F16H 59/105; F16H 59/0204
See application file for complete search history.

(56) References Cited

U.S. PATENT DOCUMENTS

| | | | | |
|---|---|---|---|---|
| 8,734,295 B2 * | 5/2014 | Kanai | ....................... | F16H 1/12 477/183 |
| 2009/0234530 A1 | 9/2009 | Takamatsu | | |
| 2012/0016559 A1 * | 1/2012 | Ueno | .................... | F16H 59/105 701/55 |
| 2013/0063133 A1 * | 3/2013 | Iwata | .................... | F16H 59/105 324/207.2 |
| 2015/0144467 A1 * | 5/2015 | Nikami | .................. | H01H 15/10 200/16 R |

FOREIGN PATENT DOCUMENTS

| | | |
|---|---|---|
| JP | 2008-002561 A | 1/2008 |
| JP | 2009-216215 A | 9/2009 |
| JP | 2013-224693 A | 10/2013 |

* cited by examiner

*Primary Examiner* — Huan Le
(74) *Attorney, Agent, or Firm* — Oliff PLC

(57) ABSTRACT

A shift lever position determination device is for a vehicle and includes an electronic control device. The electronic control device is configured to perform a majority determination in a case where more than half of the signals from the plurality of position sensors correspond to the same operating position, and configured to determine whether the operating position of the shift lever is on a M operating position side or a N operating position side in a select direction based on the magnitude relationship of the signals in a case where the majority determination is not satisfied. The electronic control device is configured to determine, in the majority determination, that the operating position corresponding to more than half of the signals is the operating position of the shift lever.

1 Claim, 8 Drawing Sheets

SHIFT LEVER POSITION DETERMINATION DEVICE FOR VEHICLE

INCORPORATION BY REFERENCE

The disclosure of Japanese Patent Application No. 2014-243989 and 2015-163271 filed on Dec. 2, 2014 and Aug. 20, 2015 including the specification, drawings and abstract is incorporated herein by reference in its entirety.

BACKGROUND OF THE INVENTION

1. Field of the Invention

The invention relates to a shift lever position determination device for a vehicle and, more particularly, to an improvement for realizing an accurate position determination that entails no discomfort on a driver's part even in a case where a shift lever-moving operation is stopped without being completed during the use of a majority determination.

2. Description of Related Art

A shift lever position determination device, which determines a shift lever operating position in accordance with a signal from a position sensor, is known. Examples thereof include the shift position determination devices that are disclosed in Japanese Patent Application Publication No. 2013-224693, Japanese Patent Application Publication No. 2008-002561, and Japanese Patent Application Publication No. 2009-216215. According to these techniques, the range of a voltage value corresponding to a specific position and the range of a voltage value corresponding to an adjacent position are defined in advance and, then the shift lever operating position can be determined based on a determination on which of the ranges covers the voltage value of the signal from the position sensor.

The shift lever is selectively operated from an M operating position of mechanical returning in a non-operation state toward any one of an N operating position that is disposed at a position which is adjacent to the M operating position in a select direction, a B operating position that is disposed at a position which is adjacent to the M operating position in a shift direction orthogonal to the select direction, and a D operating position and an R operating position that are disposed at positions which are adjacent to the N operating position on both sides in the shift direction. The shift lever position determination device detects the shift lever operating position based on a comparison between the magnitude of the signal from the position sensor that changes in accordance with the shift lever operating position and a position determination value set in advance.

The position sensor is configured to have a position-fixing circuit board and a magnetic sensor that is fixed to one side of an end portion of the shift lever on the substrate side, detects the intensity of magnetism generated from a magnet fixed to the other side, and outputs a voltage value which continuously changes in accordance with the shift lever operating position. The shift lever operating position is determined based on a result of a comparison between the voltage value and a threshold set in advance. However, the magnitude of the signal from the position sensor varies due to the variations of the characteristics of the magnet mounted on the shift lever, variations of the characteristics of the position sensor, variations of the position of the position sensor fixed to the substrate, and the like. Then, the accuracy of an operating position determination is reduced to cause inconvenience. When the shift lever operating position is positioned in the middle between a predetermined operating position and an operating position that is adjacent thereto, for example, the magnitude of the signal from the position sensor shows the median value of the signals corresponding to the respective operating positions, and thus a value biased toward either one of the operating positions is output due to the above-described variations to cause inconvenience.

In this regard, it is conceivable that predetermined shift lever operating positions are respectively determined in parallel from signals respectively output from a plurality of the position sensors and the operating position is determined based on a majority determination of the determination results. In this case, a highly reliable position determination can be carried out by the majority determination even when any of the position sensors is malfunctioning or abnormal and the shift lever operating position is positioned in the middle between the predetermined operating position and the adjacent operating position.

Still, there is room for improvement with regard to the above-described operating position determination based on the majority determination. In a case where the shift lever operating position is positioned in the middle between the adjacent operating positions as described above, for example, variations of the signals from the position sensors might cause a difference between the operating positions corresponding to the signals from the respective position sensors even when the position sensors are normal. Then, the majority determination as a result might not be satisfied when, for example, the determination result based on two out of four position sensors and the determination result based on the other two of the four position sensors differ from each other.

In the case of a uniform M position determination during the non-satisfaction of the majority determination as described above, the R range is maintained in a case where, for example, the majority determination is not satisfied with the shift lever stopped between the D operating position and the N operating position during the driver's operation of the shift lever from the M operating position toward the D operating position in the R range state. Accordingly, the R range is maintained when the driver is to perform forward traveling based on the satisfaction of the D range through the operation toward the D operating position, and a driving force that is opposite in direction to the driver's intention might be generated. The D range is maintained even in a case where the majority determination is not satisfied with the shift lever stopped between the R operating position and the N operating position during the driver's operation of the shift lever from the M operating position toward the R operating position in the D range state, and thus the D range is maintained when the driver is to perform reverse traveling. Then, a driving force that is opposite in direction to the driver's intention might be generated.

In the case of a uniform N position determination during the non-satisfaction of the majority determination as described above, the operating position is switched to the N range, although the driver is to put engine brake into effect based on the satisfaction of the B range, in a case where, for example, the majority determination is not satisfied with the shift lever stopped between the M operating position and the B operating position during the driver's operation of the shift lever from the M operating position toward the B operating position in the D range state. Accordingly, the engine brake cannot be put into effect as intended by the driver.

In other words, it is impossible to discern whether the shift lever is stopped on the N operating position side or the M operating position side when the majority determination is not satisfied. Accordingly, a uniform N operating position or M operating position determination in this case results in the generation of the opposite driving force due to the R range maintained despite the driver's intention for the forward traveling based on the D range or the unavailability of the engine brake attributable to the switching to the N range despite the driver's intention for the substantial engine brake based on the B range, which, in turn, causes significant inconvenience in the form of discomfort on the driver's part.

SUMMARY OF THE INVENTION

The invention provides a shift lever position determination device that is capable of an accurate shift lever operating position determination and causes no discomfort on a driver's part even in a case where a shift lever-moving operation is stopped without being completed while a majority determination on a shift lever operating position is performed based on signals from a plurality of position sensors.

A shift lever position determination device related to the present invention is for a vehicle. A shift lever is selectively operated from an M operating position toward any one of an N operating position, a B operating position, a D operating position, and an R operating position. The shift lever is configured to mechanically return to the M operating position when not operated. The N operating position is disposed at a position adjacent to the M operating position in a select direction. The B operating position is disposed at a position adjacent to the M operating position in a shift direction. The D operating position is disposed at a position adjacent to the N operating position on one side in the shift direction. The R operating position is disposed at a position adjacent to the N operating position on the other side in the shift direction. The select direction and the shift direction are orthogonal to each other. The shift lever position determination device includes a plurality of position sensors and an electronic control device. The plurality of position sensors are configured to output signals corresponding to the respective operating positions. The signal continuously changes in response to a movement of the shift lever between the respective operating positions. A magnitude relationship of the signals are reversed as a result of a movement of the shift lever between the M operating position and the N operating position. The electronic control device is configured to perform a majority determination in a case where more than half of the signals from the plurality of position sensors correspond to the same operating position, and configured to determine whether the operating position of the shift lever is on the M operating position side or the N operating position side in the select direction based on the magnitude relationship of the signals in a case where the majority determination is not satisfied. The electronic control device is configured to determine, in the majority determination, that an operating position corresponding to more than half of the signals is the operating position of the shift lever.

According to the invention, the plurality of position sensors output the signals continuously changing in response to the movement of the shift lever between the respective operating positions and corresponding to the respective operating positions, the magnitude relationship of the signals from the plurality of position sensors being reversed as a result of a movement of the shift lever between the M operating position and the N operating position. Accordingly, the shift operation position determination unit performs the majority determination for determining, in a case where more than half of the signals from the plurality of position sensors correspond to the same operating position, that the operating position corresponding to the signals is the operating position of the shift lever and determines whether the operating position of the shift lever is on the M operating position side or the N operating position side based on the magnitude relationship of the signals from the plurality of position sensors in a case where the majority determination is not satisfied. Accordingly, the shift lever operating position can be accurately determined and traveling ranges can be appropriately switched in compliance with a driver's intention.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
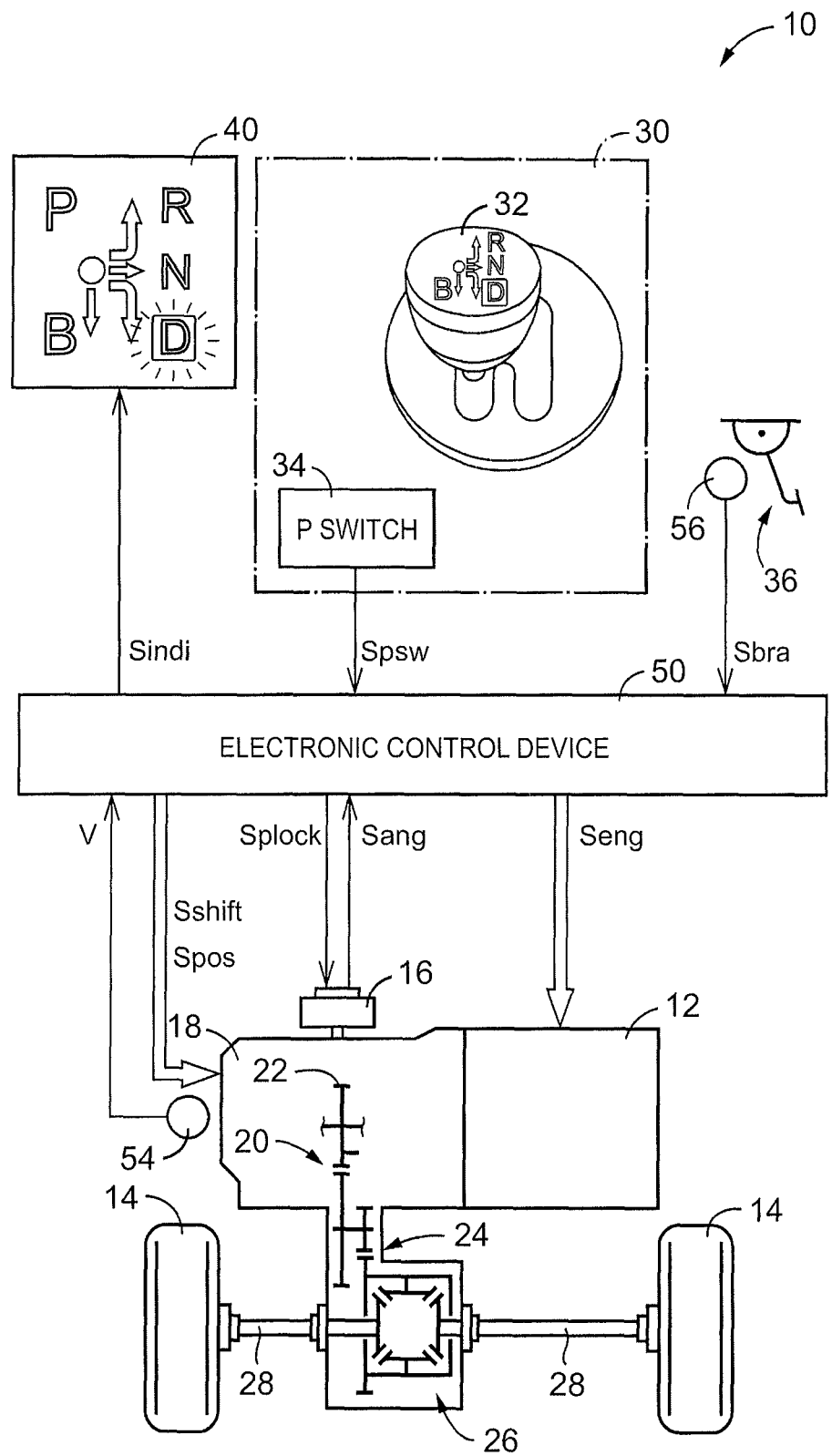
FIG. 1 is a block diagram showing a schematic configuration of a power transmission device to which the invention is preferably applied and showing a main part of a control system that is disposed in the power transmission device.

Hereinafter, a preferred embodiment of the invention will be described in detail with reference to accompanying drawings. Parts in the drawings for the following description may not be drawn with exact dimensional ratios.

FIG. 1 is a block diagram showing a schematic configuration of a power transmission path from an engine 12 to drive wheels 14 constituting a power transmission device 10 to which the invention is preferably applied and showing a main part of a control system that is disposed in the power transmission device 10. The power transmission device 10 is a drive mechanism that is preferably applied to, for example, an FF-type vehicle. As illustrated in FIG. 1, the power transmission device 10 is provided with a switching mechanism 16, an automatic transmission 18, and the like. The power transmission device 10 adopts a shift-by-wire (SBW) system, switching shift positions of the automatic transmission 18, that is, traveling ranges by electrical control. The automatic transmission 18 transmits, for example, power output from the engine 12, which is an internal combustion engine as a driving force source for traveling, from an output gear 22 as an output rotating member of the automatic transmission 18 constituting one side of a counter gear pair 20 to a pair of the drive wheels 14 via the counter gear pair 20, a final gear pair 24, a differential gear 26, a pair of drive shafts 28, and the like in the described order. The automatic transmission 18, the counter gear pair 20, the final gear pair 24, the differential gear 26, and the like constitute a transaxle as the power transmission device.

Figure 3:
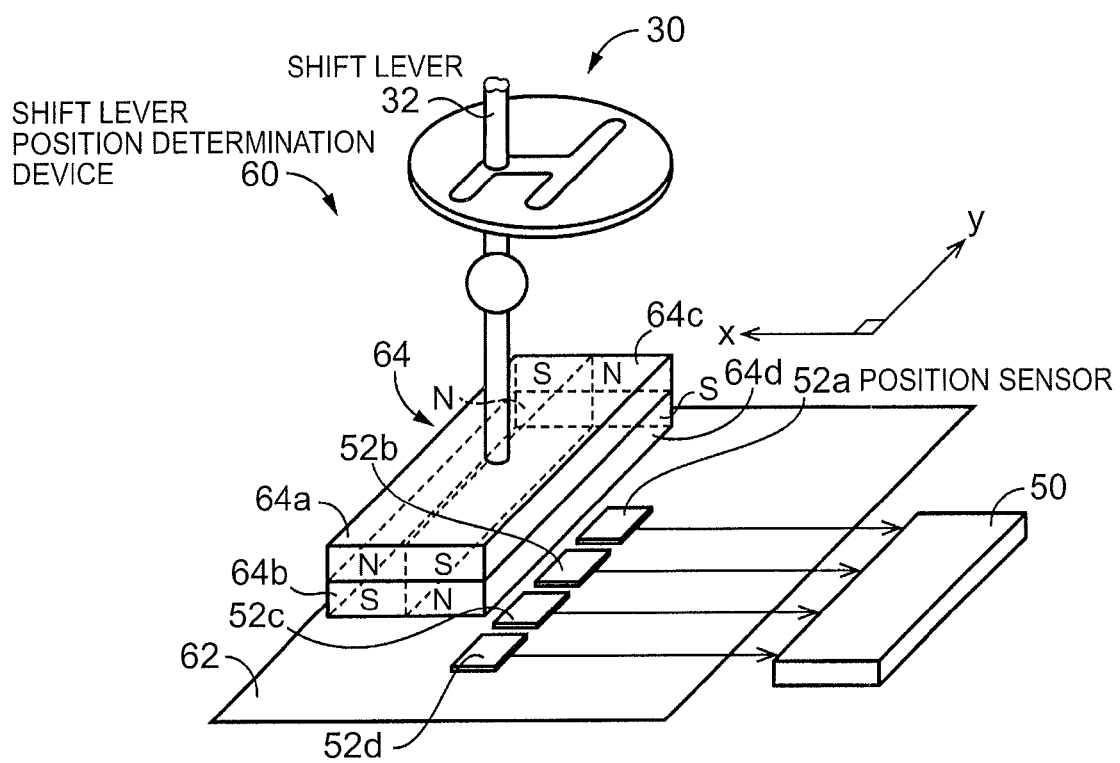
FIG. 3 is a diagram schematically illustrating an example of the configuration of a shift lever position determination device according to an embodiment of the invention.

The power transmission device 10 is provided with an electronic control device 50 that controls switching of operation states of the switching mechanism 16 and the shift positions of the automatic transmission 18, and the like. The electronic control device 50 is configured to include a so-called microcomputer that is provided with, for example, a CPU, a RAM, a ROM, and an I/O interface. The CPU executes various types of control relating to operations of the power transmission device 10 by performing signal processing in accordance with a program pre-stored in the ROM while using a temporary storage function of the RAM. For example, the electronic control device 50 executes vehicle control such as output control for the engine 12, shift control for the automatic transmission 18, shift position switching control for the automatic transmission 18 using the shift-by-wire system, and operation state switching control for the switching mechanism 16. If necessary, the electronic control device 50 may be configured to be divided into, for example, one for the output control for the engine 12 and the other for the shift control for the automatic transmission 18. The electronic control device 50 performs shift operating position determination control for determining an operating position of a shift lever 32 in accordance with signals that are supplied from position sensors 52a, 52b, 52c, 52d (hereinafter, simply referred to as position sensors 52 when not particularly distinguished) which are illustrated in FIG. 3 and the like. In other words, the electronic control device 50 constitutes a part of a shift lever position determination device 60 along with the position sensors 52 in this embodiment.

Not only the signals from the position sensors 52 but also various signals that are detected by various sensors which are disposed in the power transmission device 10 are supplied to the electronic control device 50. Examples of the latter include a P switch signal Spsw from a P switch 34 as an operation signal corresponding to an operating position (P switch ON position) Psw resulting from an operation of the P switch 34, a vehicle speed signal from a vehicle speed sensor 54 that shows a vehicle speed V corresponding to an output rotation speed of the automatic transmission 18, and a brake operation signal Sbra from a brake switch 56 that shows a brake ON state where a foot brake pedal 36 which is a service brake is operated. Various signals for controlling operations of different devices disposed in the power transmission device 10 are output from the electronic control device 50. Examples of these signals include an engine output control command signal Seng for the output control for the engine 12, a P switching control command signal Splock for the switching control for the switching mechanism 16, a shift control command signal Sshift for the shift control for the automatic transmission 18, a shift position switching control command signal Spos for switching the shift positions of the automatic transmission 18, and a shift position display signal Sindi for displaying the shift positions (including a P position) of the automatic transmission 18 by operating an indicator 40.

The power transmission device 10 is provided with a shift operation device 30 in the vicinity of, for example, a driver's seat. The shift operation device 30 is provided with, for example, the shift lever 32 and the P switch 34. The shift lever 32 and the P switch 34 are operators that are selectively operated by the driver in accordance with a plurality of operating positions (lever positions Plev and P switch ON position Psw) corresponding to the plurality of shift positions of the automatic transmission 18. Each of the shift lever 32 and the P switch 34 is a momentary operator that returns to its original position (initial position) in a non-operation state where no external force is applied, that is, an operator returning to the initial position when not operated by the driver (that is, an automatically-returning operator automatically returning to the initial position when an operating force is removed). The shift lever 32 is alternatively operated toward the plurality of lever positions Plev by the driver so that the shift position of the automatic transmission 18 is changed to a desired shift position (R, N, D position) other than the parking position (P position) from an M position of mechanical returning in the non-operation state. The P switch 34, which is an operator that is provided as an additional switch in the vicinity of the shift lever 32, is operated by the driver so that the shift position of the automatic transmission 18 is changed to the P position and parking lock is achieved.

Figure 2:
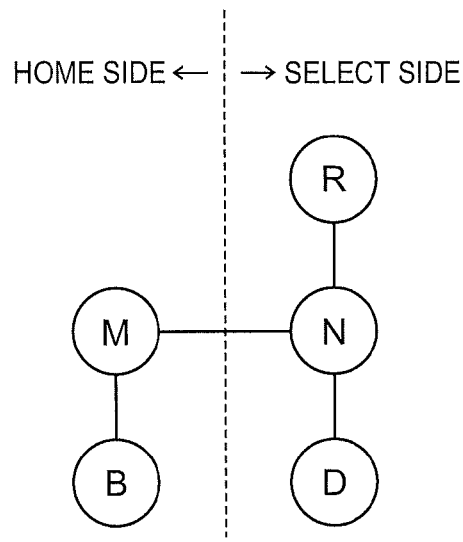
FIG. 2 is a diagram showing an example of shift lever operating positions in a shift operation device that is provided in the power transmission device illustrated in FIG. 1.

FIG. 2 is a diagram showing an example of the operating positions (gate pattern) of the shift lever 32 of the shift operation device 30. As illustrated in FIG. 2, for example, the R operating position (R operating position), the N operating position (N operating position), and the D position (D operating position), which are the three lever positions Plev that are arranged in the forward-rearward direction or the upward-downward direction (hereinafter, referred to as a shift direction) of the vehicle, are defined as the operating positions of the shift lever 32 in the shift operation device 30. In the following description, these operating positions will be referred to as select side operating positions. The M operating position (M operating position) and a B operating position (B operating position) are defined to be arranged in parallel to the select side operating positions. In the following description, these operating positions will be referred to as home side operating positions. The shift lever 32 can be operated in the shift direction among the R operating position, the N operating position, and the D operating position. The shift lever 32 can be operated in the shift direction between the M operating position and the B operating position. The shift lever 32 can be operated in a select direction of the vehicle (hereinafter, referred to as a select direction), which is orthogonal to the shift direction, between the M operating position and the N operating position. The M operating position is the initial position (home position) of the shift lever 32. Even in the event of a shift operation to the lever position Plev (R, N, D, B operating position) other than the M operating position, the shift lever 32 is allowed to return to the M operating position by a mechanical mechanism such as a spring when the driver releases the shift lever 32 (that is, when the external force acting on the shift lever 32 is removed).

In the shift operation device 30 described in this embodiment, the shift lever 32 is operated toward any one of the five operating positions, that is, the M operating position, the B operating position, the R operating position, the N operating position, and the D operating position as illustrated in FIG. 2. However, the invention is preferably applied to other types of shift operation devices as well. For example, the invention is also preferably applied to a shift operation device in which the shift lever 32 has an additional operating position as well as the five operating positions, that is, the M operating position, the B operating position, the R operating position, the N operating position, and the D operating position. The invention is widely applied to a shift operation device that is provided with a shift pattern having a home position (position for maintaining a previous value) instead of being limited to the shift operation device 30 that is provided with the momentary operator as described above. For example, the invention is also preferably applied to a shift operation device in which the shift lever does not return to a predetermined operating position even after the release of the operating force applied to the shift lever.

The P switch 34 is, for example, a momentary push button switch. Whenever the driver pushes the P switch 34 to the P operating position (P operating position), which is the P switch ON position Psw, the P switch signal Spsw is output to the electronic control device 50. The P switch 34 is at the initial position (home position) in a state where the P switch 34 is not pushed. Even when the P switch 34 is pushed to the P switch ON position Psw, the P switch 34 is allowed to return to the initial position by the mechanical mechanism such as the spring when the P switch 34 is released by the driver.

When the shift lever 32 or the P switch 34 is operated to each of the operating positions in the shift operation device 30, the electronic control device 50 allows the shift position of the automatic transmission 18 to be switched based on the operation signal corresponding to the operating position and the current operating position, that is, the state of the shift position of the automatic transmission 18 to be displayed on the indicator 40 as illustrated in FIG. 1. In the shift operation device 30 according to this embodiment, the shift lever 32 and the P switch 34 return to the initial positions when the external force acting on the shift lever 32 and the P switch 34 disappears, and thus it is impossible to recognize a selected shift position by visual confirmation of the shift lever 32 and the P switch 34 alone. Accordingly, the indicator 40 is disposed at a position easily seen by the driver and the display on the indicator 40 covers a case where the selected shift position is the P position.

Hereinafter, the respective shift positions (P, R, N, D positions) of the automatic transmission 18 will be described. The P position, which is selected when the P switch 34 is pushed to the P switch ON position Psw, is a parking position at which the power transmission path in the automatic transmission 18 is disconnected and parking lock (P lock) for mechanically blocking the rotation of the drive wheels 14 with the switching mechanism 16 is executed. The R position, that is, an R range, which is selected when the shift lever 32 is shift-operated to the R operating position, is a reverse traveling position at which a driving force for reverse vehicle traveling is transmitted to the drive wheels 14, that is, a reverse traveling range for reverse vehicle traveling. The neutral position, that is, the N position, which is selected when the shift lever 32 is shift-operated to the N operating position, is a neutral position for a neutral state where the power transmission path in the automatic transmission 18 is disconnected. The D position, that is, a D range, which is selected when the shift lever 32 is shift-operated to the D operating position, is a forward traveling position at which a driving force for forward vehicle traveling is transmitted to the drive wheels 14, that is, a forward traveling range for forward vehicle traveling. The B position, which is selected when the shift lever 32 is shift-operated to the B operating position, is a decelerated forward traveling position (engine brake range) at which the rotation of the drive wheels 14 is decelerated with engine brake in effect during forward traveling.

FIG. 3 is a diagram schematically illustrating an example of the configuration of the shift lever position determination device 60 (hereinafter, simply referred to as a position determination device 60) that is provided in the shift operation device 30. In FIG. 3, the x axis represents the select direction and the y axis represents the shift direction. As described above, the shift lever 32 of the shift operation device 30 is two-dimensionally shift-operated in the shift direction shown as the y axis in FIG. 3 and in the select direction orthogonal to the shift direction and shown as the x axis in FIG. 3. In the position determination device 60 according to this embodiment, the plurality of (four in FIG. 3) position sensors 52a, 52b, 52c, 52d are arranged on a substrate 62 at substantially equal intervals in the shift direction shown as the y axis in FIG. 3 so that the operating position of the shift lever 32 is determined. The substrate 62 is disposed to have a fixed position in a frame (not illustrated) of the shift operation device 30. In other words, the plurality of position sensors 52 are arranged in the direction in which the R operating position, the N operating position, and the D operating position of the shift lever 32 are arranged. Although the position determination device 60 that is provided with the position sensors 52 of this type will be described below, other types of position sensors are also conceivable for the shift lever position determination device of the invention. For example, a sensor that detects a movement in the shift direction relating to the shift lever 32 and a sensor that detects a movement in the select direction relating to the shift lever 32 may be provided and shift lever position determination control described in detail below may be performed in accordance with the combination of these sensors. Two sets of sensors may be provided in relation to the shift direction and the operating position of the shift lever 32 may be determined in a case where the two sets of sensors make the same determination.

A permanent magnet (hereinafter, referred to as a magnet) 64 is mounted on an end portion of the shift lever 32 on the substrate 62 side. This magnet 64 is not in contact with the plurality of position sensors 52 that are disposed on the substrate 62, and the magnet 64 has a positional relationship allowing a magnetic field to be generated around the position sensors 52. Preferably, the magnet 64 is a combination of four permanent magnets each being formed to have a rectangular shape (elongated shape) and is configured for a longitudinal direction of the magnet 64 to correspond to the shift direction shown as the y axis in FIG. 3. For example, the magnet 64 is mounted on the end portion of the shift lever 32 on the substrate 62 side, as illustrated in FIG. 3, so that a longitudinal direction of each of four magnet pieces 64a, 64b, 64c, 64d corresponds to the shift direction shown as the y axis in FIG. 3. Preferably, the shift lever 32 is mounted substantially on the center of the magnet 64 in a plan view. In other words, the shift lever 32 is mounted on the center of the magnet 64 in the shift direction and on the center of the magnet 64 in the select direction. The magnet 64 is a combination in which the S pole of the magnet piece 64a is on the R operating position side (the N pole being on the D operating position side). The magnet piece 64b is combined on the substrate 62 side with respect to the magnet piece 64a. The N pole of the magnet piece 64b is on the R operating position side (the S pole being on the D operating position side). The magnet piece 64c is combined on the select direction side with respect to the magnet piece 64a. The N pole of the magnet piece 64c is on the R operating position side (the S pole being on the D operating position side). The magnet piece 64d is combined on the substrate 62 side with respect to the magnet piece 64c, that is, on the select side in the select direction with respect to the magnet piece 64b. The S pole of the magnet piece 64d is on the R operating position side (the N pole being on the D operating position side). The above-described configuration causes the magnet 64 to be moved in compliance with a movement of the shift lever 32, that is, a change in operating position, which results in a change in relative positions in the shift direction and the select direction with respect to the plurality of position sensors 52 disposed on the substrate 62.

Figure 4:
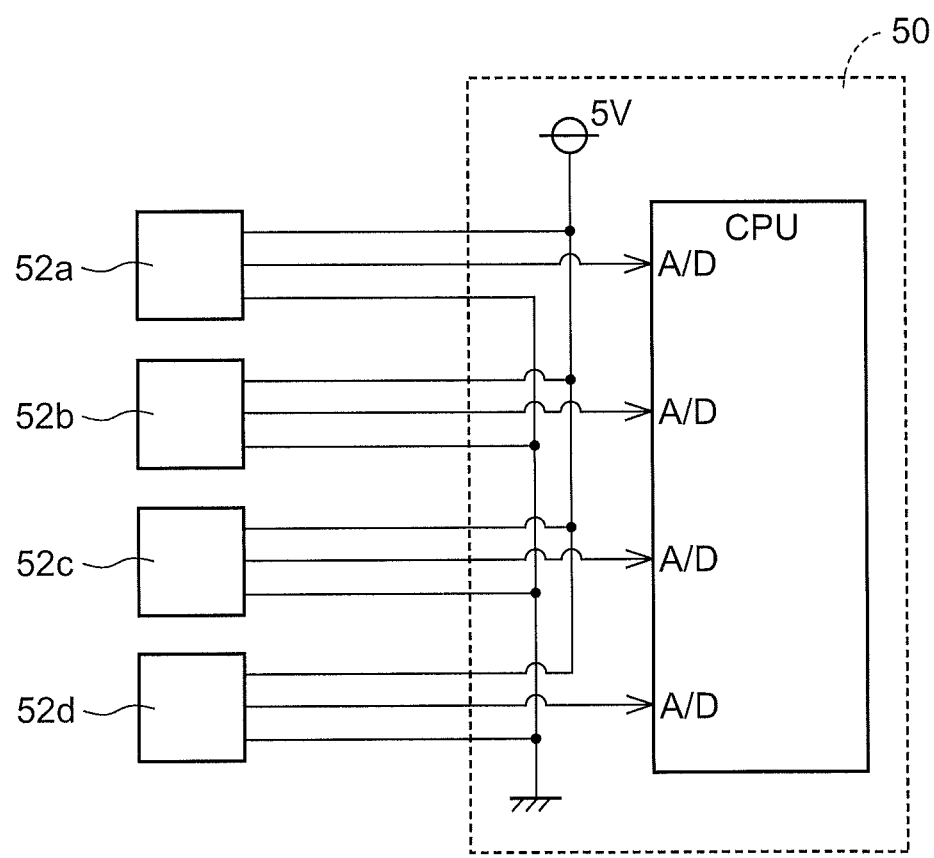
FIG. 4 is a circuit diagram showing an example of an electrical configuration relating to a plurality of position sensors that are provided in the shift lever position determination device illustrated in FIG. 3.

FIG. 4 is a circuit diagram showing an example of an electrical configuration relating to the plurality of position sensors 52. Preferably, the position sensors 52 are Hall elements (Hall ICs) detecting the intensity of a magnetic field (magnetic force) by using the Hall effect and output a signal as a voltage of for example, 0 to 5.0 V in accordance with the direction and intensity of the surrounding magnetic field. For example, the position sensors 52 output a signal as a voltage of 5.0 V, which is a maximum signal, or approximately 4.5 V, which is below the maximum signal, in response to a magnetic field with an intensity of at least a predetermined value corresponding to a first magnetic pole direction. In addition, the position sensors 52 output a signal as a voltage of 0 V, which is the minimum signal, or approximately 0.5 V, which exceeds the minimum signal, in response to a magnetic field with an intensity of at least a predetermined value corresponding to a second magnetic pole direction that is opposite to the first magnetic pole direction (that is, the S pole and the N pole being reversed). In addition, the position sensors 52 output a signal as a voltage of approximately 2.5 V, which is an intermediate signal, in a case where no magnetic field is present (the magnetic field intensity is zero). Then, the position sensors 52 output a signal as a voltage between the maximum signal and the intermediate signal and a voltage increasing as the intensity of the magnetic field increases in accordance with the intensity of the magnetic field corresponding to the first magnetic pole direction. The position sensors 52 output a signal as a voltage between the intermediate signal and the minimum signal and a voltage decreasing as the intensity of the magnetic field increases in accordance with the intensity of the magnetic field corresponding to the second magnetic pole direction. The voltages as the signals output from the position sensors 52 are input to the electronic control device 50. The signals from the position sensors 52 input to the electronic control device 50 are converted into digital signals, are supplied to the CPU of the electronic control device 50, and are used in shift lever operating position determination control described in detail below.

Figure 5:
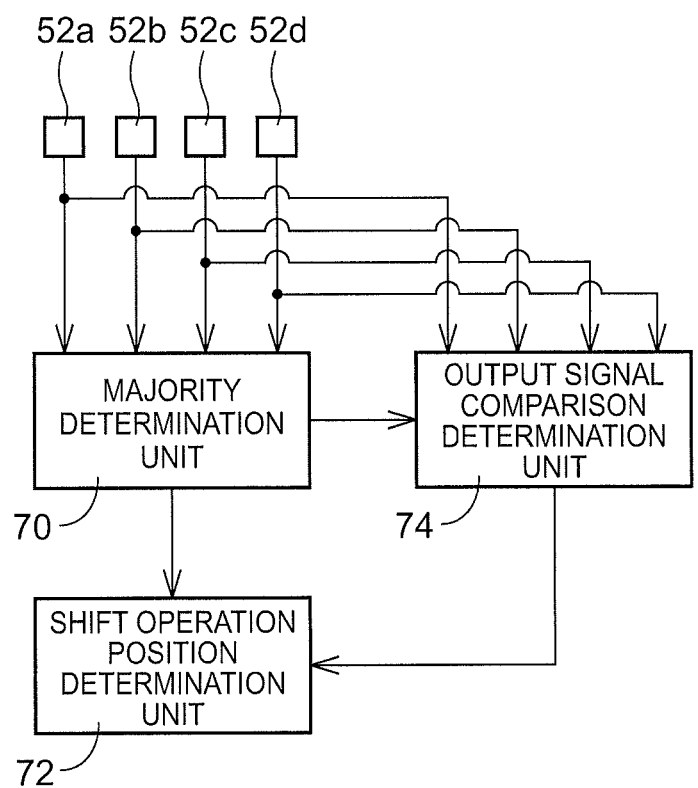
FIG. 5 is a functional block diagram showing a main part of an example of a control function of an electronic control device of the shift lever position determination device illustrated in FIG. 3.

FIG. 5 is a functional block diagram showing a main part of an example of a control function of the electronic control device 50. Preferably, each of a majority determination unit 70, a shift operation position determination unit 72, and a signal comparison determination unit 74 that are illustrated in FIG. 5 is functionally provided in the electronic control device 50. One or more of the majority determination unit 70, the shift operation position determination unit 72, and the signal comparison determination unit 74 may be provided as a control unit separate from the electronic control device 50 so that the control that will be described in detail below is realized through mutual information transmission and reception.

Figure 6:
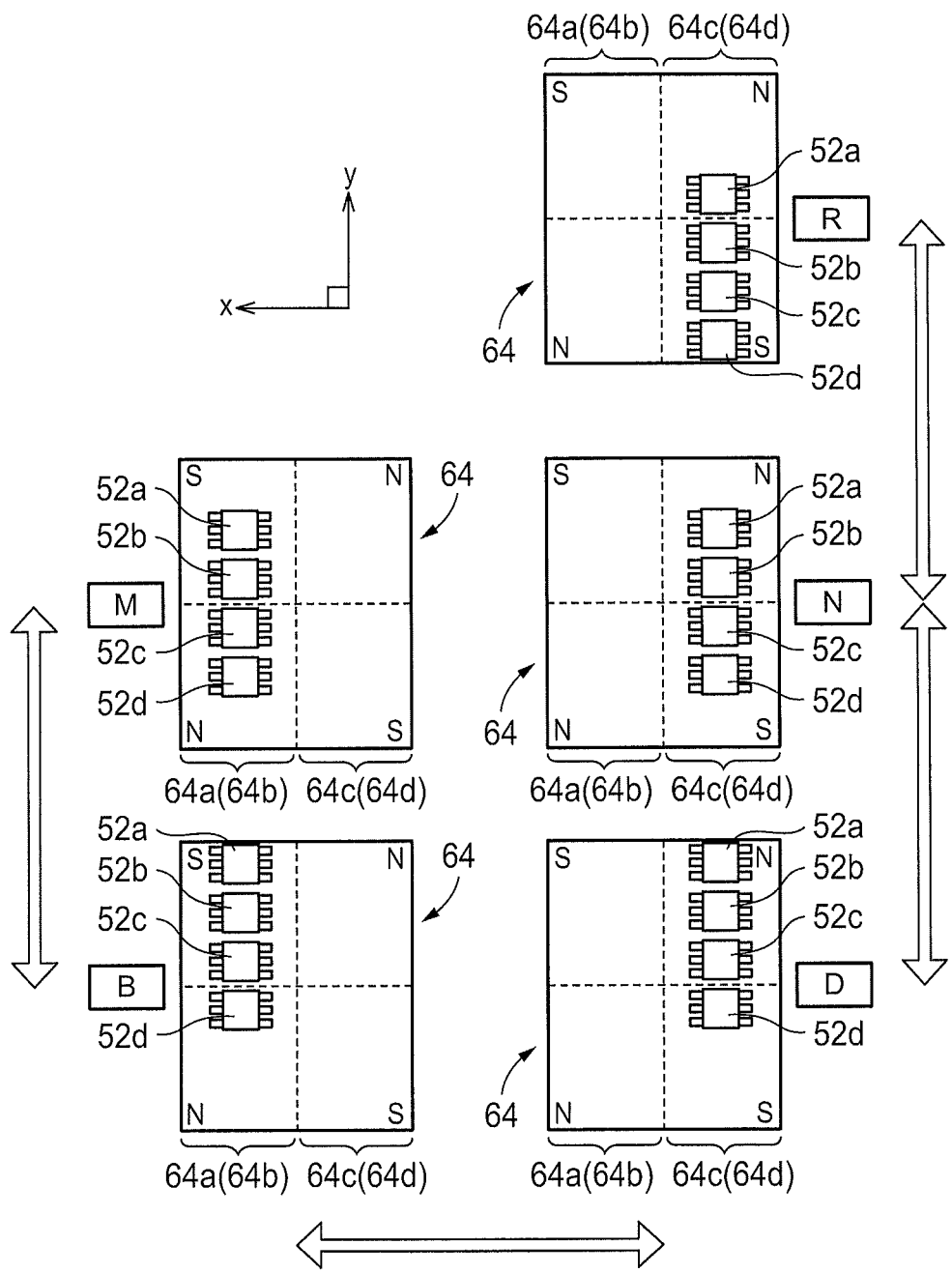
FIG. 6 is a plan view illustrating an example of the relative positional relationship between the position sensors and a magnet by shift lever operating position in the shift lever position determination device illustrated in FIG. 3.

FIG. 6 is a plan view illustrating an example of the relative positional relationship between the plurality of position sensors 52 and the magnet 64 by operating position of the shift lever 32. In FIG. 6, the x axis represents the select direction and the y axis represents the shift direction as in FIG. 3. The M operating position is shown as "M", the B operating position is shown as "B", the N operating position is shown as "N", the R operating position is shown as "R", and the D operating position is shown as "D". The relative positional relationship between the magnet 64 mounted on the shift lever 32 and the plurality of position sensors 52 changes when the operating position of the shift lever 32 changes in the shift operation device 30 as described above. Then, the magnetic field around the plurality of position sensors 52 changes and the voltage as the signal output from each of the position sensors 52 changes. In other words, the position determination device 60 according to this embodiment can determine the operating position of the shift lever 32 by determining which of the patterns determined in advance and corresponding to the respective operating positions corresponds to the pattern of the voltage output from each of the plurality of position sensors 52.

Specifically, the plurality of position sensors 52 have a relative positional relationship in which the plurality of position sensors 52 are arranged at a position corresponding to the magnet piece 64a (64b) in a plan view in a case where the shift lever 32 is at the home side operating position in relation to the select direction shown as the x axis in FIG. 6. The position sensors 52a, 52b are positioned on the S pole side of the magnet piece 64a (N pole side of 64b) and the position sensors 52c, 52d are positioned on the N pole side of the magnet piece 64a (S pole side of 64b) in a case where the shift lever 32 is at the M operating position. The position sensors 52a, 52b, 52c are positioned on the S pole side of the magnet piece 64a (N pole side of 64b) and the position sensor 52d is positioned on the N pole side of the magnet piece 64a (S pole side of 64b) in a case where the shift lever 32 is at the B operating position. The plurality of position sensors 52 have a relative positional relationship in which the plurality of position sensors 52 are arranged at a position corresponding to the magnet piece 64c (64d) in a plan view in a case where the shift lever 32 is at the select side operating position. The position sensor 52a is positioned on the N pole side of the magnet piece 64c (S pole side of 64d) and the position sensors 52b, 52c, 52d are positioned on the S pole side of the magnet piece 64c (N pole side of 64d) in a case where the shift lever 32 is at the R operating position. The position sensors 52a, 52b are positioned on the N pole side of the magnet piece 64c (S pole side of 64d) and the position sensors 52c, 52d are positioned on the S pole side of the magnet piece 64c (N pole side of 64d) in a case where the shift lever 32 is at the N operating position. The position sensors 52a, 52b, 52c are positioned on the N pole side of the magnet piece 64c (S pole side of 64d) and the position sensor 52d is positioned on the S pole side of the magnet piece 64c (N pole side of 64d) in a case where the shift lever 32 is at the D operating position.

As described above, it is preferable that each of the plurality of position sensors 52 is a Hall element that outputs a voltage in accordance with the direction and intensity of the surrounding magnetic field and outputs the voltage as a signal showing each operating position of the shift lever 32 as the relative positions in relation to the magnet 64 change in response to a movement of the shift lever 32. In other words, it is preferable that each of the plurality of position sensors 52 functions as a redundant sensor that can detect each of the operating positions of the shift lever 32 for itself in the position determination device 60 according to this embodiment.

In other words, the position determination device 60 according to this embodiment is provided with at least three (four in this embodiment) redundant sensors detecting the respective operating positions of the shift lever 32.

The majority determination unit 70 that is illustrated in FIG. 5 determines the operating position corresponding to the signal from the largest number of the position sensors 52 in response to the signals from the plurality of position sensors 52. In other words, the majority determination unit 70 that is illustrated in FIG. 5 determines the operating position corresponding to the signal from more than half of the position sensors 52 (that is, at least three of the position sensors 52 in this embodiment). Alternatively, a majority determination for determining the operating position corresponding to the signal from the largest number of the position sensors 52 may be performed in a case where the signal from at least two of the position sensors 52 corresponds to any one of the operating positions (same operating position). Preferably, the operating position is determined based on the consistency of the operating positions corresponding to the signal from every position sensor 52. In other words, the majority determination unit 70 does not perform the majority determination in a case where the operating position corresponding to the signal from at least two of the position sensors 52 is absent, examples of which include the plurality of position sensors 52 outputting signals corresponding to different operating positions without exception. In other words, the majority determination is not satisfied in that case.

Figure 7:
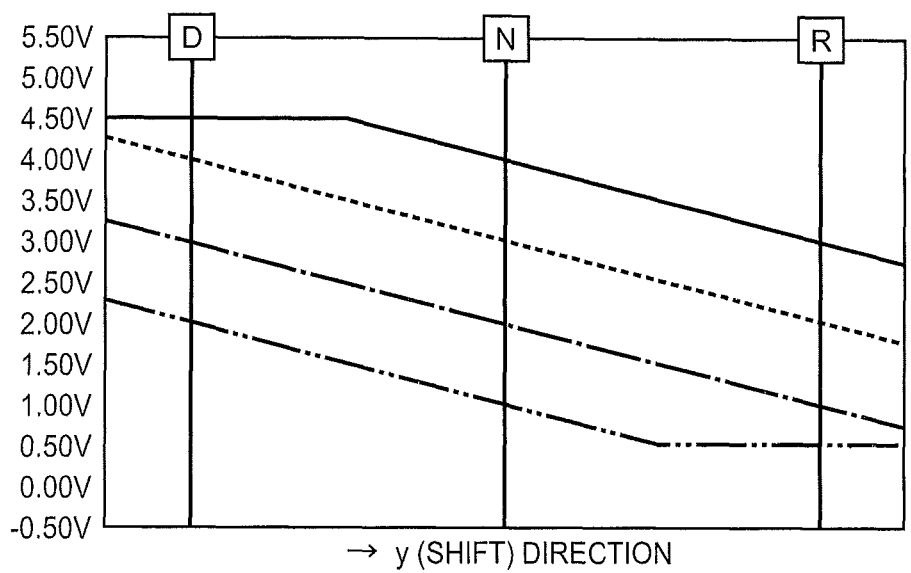
FIG. 7 is a diagram illustrating an example of the output characteristics of the position sensors by shift lever operating position in the shift lever position determination device illustrated in FIG. 3.
Figure 8:
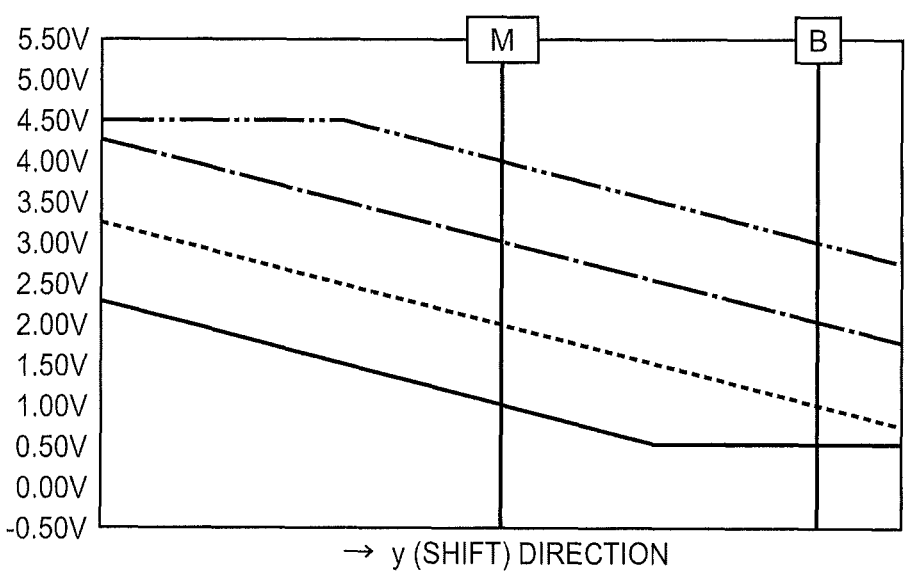
FIG. 8 is a diagram illustrating an example of the output characteristics of the position sensors by shift lever operating position in the shift lever position determination device illustrated in FIG. 3.

FIGS. 7 and 8 are diagrams illustrating an example of the output characteristics (output patterns) of the plurality of position sensors 52 depending on the operation of the shift lever 32 in the shift direction. The solid line represents the signal from the position sensor 52a, the dashed line represents the signal from the position sensor 52b, the one-dot chain line represents the signal from the position sensor 52c, and the two-dot chain line represents the signal from the position sensor 52d. The M operating position is shown as "M", the B operating position is shown as "B", the N operating position is shown as "N", the R operating position is shown as "R", and the D operating position is shown as "D" (as in FIG. 9 to be described later). The majority determination unit 70 performs the majority determination based on the output characteristics illustrated in FIGS. 7 and 8 and from determination thresholds which are, for example, experimentally obtained and defined in advance. Regarding the N operating position, for example, it is determined whether or not the signals from the position sensors 52a, 52b, 52c, 52d are values within ranges of upper and lower limit values of the determination thresholds set in advance for a determination of the N operating position around 4.0 V, 3.0 V, 2.0 V, and 1.0 V, respectively. In a case where the determination relating to more than half of the position sensors 52 (that is, at least three of the position sensors 52 in this embodiment) is positive in the determination, it is determined that the N operating position is the operating position corresponding to the signal from the largest number of the position sensors 52. In a case where the determination relating to all the position sensors 52 is positive, it is determined that the N position is the operating position corresponding to the signal from the largest number of the position sensors 52. The majority determination unit 70 makes similar majority determinations with regard to the D operating position, the R operating position, and the B operating position as well. In other words, the majority determination unit 70 makes the majority determination based on whether or not the signals from the position sensors 52a, 52b, 52c, 52d are values within the ranges of the upper and lower limit values of the determination thresholds set in advance for determinations of the D operating position, the R operating position, and the B operating position, respectively.

The shift operation position determination unit 72 determines the operating position of the shift lever 32 in accordance with the signals from the plurality of position sensors 52. Basically, the operating position that is majority-determined by the majority determination unit 70 is determined as the operating position of the shift lever 32. In other words, the shift operation position determination unit 72 determines that the operating position which is determined by the majority determination unit 70 as the operating position corresponding to the signal from more than half of the position sensors 52 is the operating position of the shift lever 32. Alternatively, when the signals from all the position sensors 52 correspond to the same operating position, the shift operation position determination unit 72 determines that the operating position is the operating position of the shift lever 32.

Figure 9:
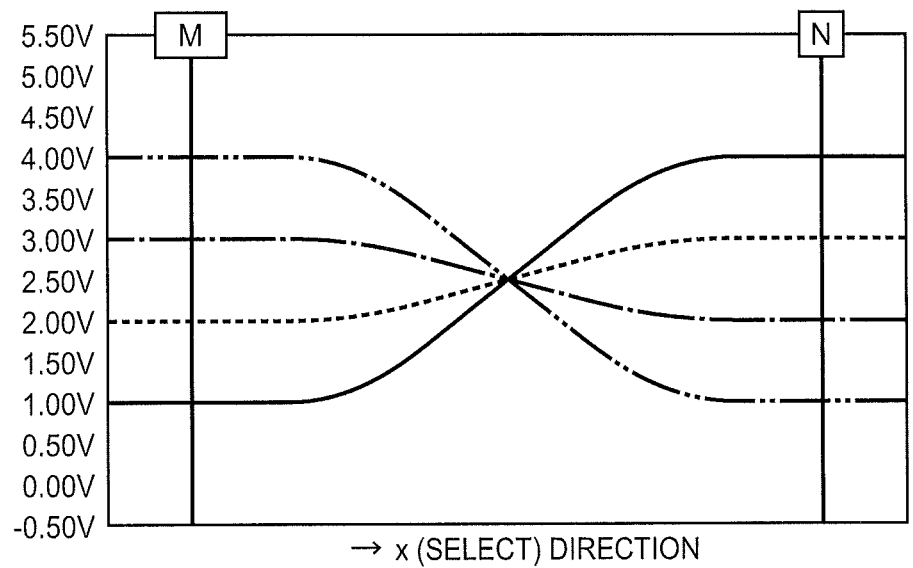
FIG. 9 is a diagram illustrating an example of the output characteristics of the position sensors by shift lever operating position in the shift lever position determination device illustrated in FIG. 3.

In a case where the majority determination by the majority determination unit 70 is not satisfied, the signal comparison determination unit 74 compares the signals from two or more of the position sensors 52 with different signal change characteristics resulting from a movement of the shift lever 32 to each other and determines whether the shift lever 32 is on the M operating position side or the N operating position side in the select direction. FIG. 9 is a diagram illustrating an example of the output characteristics of the plurality of position sensors 52 pertaining to the case of a movement of the shift lever 32 in the select direction, that is, a movement of the shift lever 32 between the M operating position and the N operating position. As illustrated in FIG. 9, the position sensors 52a, 52d that are provided in the position determination device 60 of this embodiment have a signal magnitude relationship (voltage magnitude relationship) reversed (inverted) as a result of the movement of the shift lever 32 in the select direction and the reversal occurs, for example, the middle between the M operating position and the N operating position. Likewise, the position sensors 52b, 52c have a signal magnitude relationship reversed as a result of the movement of the shift lever 32 in the select direction. This is because the magnet 64 has the configuration described above with reference to FIG. 3, the movement of the shift lever 32 in the select direction causes the position of the magnet 64 corresponding to the position sensors 52 to become the position corresponding to the magnet pieces 64a, 64b at the home side operating position and to become the position corresponding to the magnet pieces 64c, 64d at the select side operating position, and the direction of the magnetic field around the position sensors 52 is reversed. The magnitude relationship of the signals is maintained with regard to FIGS. 7 and 8 as well. Accordingly, in a case where the majority determination by the majority determination unit 70 is not satisfied, the signal comparison determination unit 74 compares the magnitudes of the signals from the position sensors 52a, 52d (or the magnitudes of the signals from the position sensors 52b, 52c) to each other from the output characteristics illustrated in FIGS. 7, 8, and 9, and determines that the shift lever 32 is on the M operating position side when, for example, the magnitude of the signal from the position sensor 52a shown by the solid line exceeds the magnitude of the signal from the position sensor 52d shown by the two-dot chain line as illustrated in FIG. 7 and determines that the shift lever 32 is on the N operating position side when, for example, the magnitude of the signal from the position sensor 52a shown by the solid line is exceeded by the magnitude of the signal from the position sensor 52d shown by the two-dot chain line as illustrated in FIG. 8.

Regarding the determination on whether the operating position of the shift lever 32 is on the M operating position side or the N operating position side, the shift operation position determination unit 72 does not have to perform this determination when it is determined by the majority determination unit 70 that no majority determination is made in relation to the operating position corresponding to the signal from the position sensors 52. Instead, the shift operation position determination unit 72 may determine in advance whether the operating position of the shift lever 32 is on the M operating position side or the N operating position side based on the reversal of the signal from the position sensor 52a shown by the solid line and the signal from the position sensor 52d shown by the two-dot chain line in the relationship which is illustrated in FIG. 9 during the course of a passage of the shift lever 32 from the M operating position to the N operating position and perform temporary storage until the traveling range is satisfied with the operating position of the shift lever 32 determined.

In a case where the majority determination of the N operating position is not satisfied with the shift lever 32 stopped between the M operating position and the N operating position during the driver's operation of the shift lever 32 from the M operating position to the N operating position for coasting of the vehicle based on a release of engine brake of the vehicle in a state where the B range is satisfied, for example, the shift operation position determination unit 72 determines whether the select direction position of the shift lever 32 is on the M operating position side or the N operating position side based on the magnitude relationship of the respective signals from the position sensors 52. When it is determined that the select direction operation of the shift lever 32 is on the N operating position side, the shift operation position determination unit 72 determines that the operating position of the shift lever 32 is the N operating position based on that determination. The electronic control device 50 allows the neutral range to be satisfied when it is determined by the shift operation position determination unit 72 that the operating position of the shift lever 32 is the N operating position as described above.

In a case where the majority determination of the D operating position is not satisfied with the shift lever 32 stopped between the D operating position and the N operating position during the driver's operation of the shift lever 32 from the M operating position to the D operating position for forward traveling in a state where the R range is satisfied, for example, the shift operation position determination unit 72 determines whether the select direction position of the shift lever 32 is on the M operating position side or the N operating position side based on the magnitude relationship of the respective signals from the position sensors 52. When it is determined that the select direction operation of the shift lever 32 is on the N operating position side, the shift operation position determination unit 72 determines that the operating position of the shift lever 32 is the N operating position based on that determination. The electronic control device 50 allows the N range to be satisfied when it is determined by the shift operation position determination unit 72 that the operating position of the shift lever 32 is the N operating position as described above.

In a case where no majority determination is satisfied with the shift lever 32 stopped between the R operating position and the N operating position during the driver's operation of the shift lever 32 from the M operating position to the R operating position for reverse traveling in a state where the D range is satisfied, for example, the shift operation position determination unit 72 determines whether the select direction position of the shift lever 32 is on the M operating position side or the N operating position side based on the magnitude relationship of the respective signals from the position sensors 52. When it is determined that the select direction operation of the shift lever 32 is on the N operating position side, the shift operation position determination unit 72 determines that the operating position of the shift lever 32 is the N operating position based on that determination. The electronic control device 50 allows the N range to be satisfied when it is determined by the shift operation position determination unit 72 that the operating position of the shift lever 32 is the N operating position as described above.

In a case where no majority determination is satisfied with the shift lever 32 stopped between the M operating position and the B operating position during the driver's operation of the shift lever 32 from the M operating position to the B operating position for engine brake in a state where the vehicle travels with a traveling range such as the D range satisfied, for example, the shift operation position determination unit 72 determines whether the select direction position of the shift lever 32 is on the M operating position side or the N operating position side based on the magnitude relationship of the respective signals from the position sensors 52. When it is determined that the select direction operation of the shift lever 32 is on the M operating position side, the shift operation position determination unit 72 determines that the operating position of the shift lever 32 is the M operating position based on that determination. The electronic control device 50 maintains the D range when it is determined by the shift operation position determination unit 72 that the operating position of the shift lever 32 is the M operating position as described above.

Figure 10A:
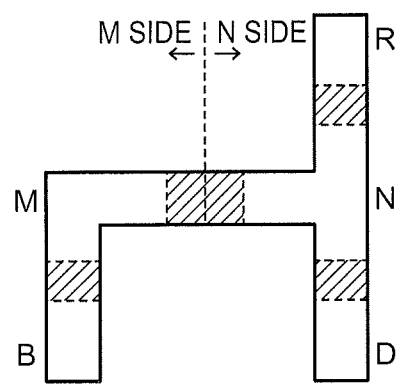
FIG. 10A is a diagram schematically showing an effect of shift lever position determination control according to this embodiment.
Figure 10B:
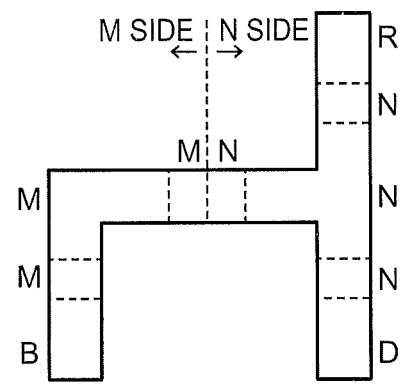
FIG. 10B is a diagram schematically showing an effect of shift lever position determination control according to this embodiment.

An effect of the shift lever position determination control according to this embodiment is schematically illustrated in FIGS. 10A and 10B. FIG. 10A illustrates shift lever position determination control according to the related art and FIG. 10B illustrates the shift lever position determination control according to this embodiment. Regions where the majority determination is not satisfied and the determination of the operating position of the shift lever 32 is difficult in the shift lever position determination control according to the related art are illustrated by the ranges of the upward-slope oblique lines in FIG. 10A. In the shift lever position determination control according to the related art, the regions where the majority determination is not satisfied and the determination of the operating position of the shift lever 32 is difficult are present between the M operating position and the N operating position, between the M operating position and the B operating position, between the N operating position and the D operating position, and between the N operating position and the R operating position as illustrated in FIG. 10A. In other words, In a case where the operating position of the shift lever 32 is positioned in the middle between the operating positions that are adjacent to each other such as between the D operating position or the R operating position and the N operating position and in the middle between the B operating position and the M operating position, the signals from the position sensors 52 are in the vicinity of the median value of the signals corresponding to the respective operating positions, and thus the majority determination tends not to be satisfied and the region where the operating position determination is difficult expands due to the variations of the signals from the position sensors 52.

In a case where more than half of the signals from the plurality of position sensors 52 correspond to the same operating position and the majority determination for determining that the single operating position to which those signals correspond is the operating position of the shift lever 32, the operating position corresponding to the signals from the respective position sensors 52 might vary and the majority determination might be impossible as a result thereof due to the variations of the signals from the position sensors 52, despite the position sensors 52 being normal, in a case where the operating position of the shift lever 32 is positioned in the middle between the operating positions that are adjacent to each other as described above. Switching of the traveling ranges reflecting the driver's intention might be impossible in a case where the determination on whether the operating position of the shift lever 32 is the M operating position or the N operating position cannot be accurately performed during the movement of the shift lever 32 between the respective operating positions. In a case where the D range is satisfied and an operation for switching the operating position of the shift lever 32 to the R operating position is performed but the majority determination on whether the operating position of the shift lever 32 is the M operating position or the N operating position is not satisfied when the shift lever 32 is stopped between the M operating position and the N operating position during the course of the switching, the electronic control device 50 cannot discern the operating position to which the shift lever 32 is moved and switching in driving force to the direction reflecting the driver's intention might be impossible. In addition, when the majority determination is not satisfied with the shift lever 32 stopped between the M operating position and the B operating position during the driver's operation toward the B operating position in the D range, the electronic control device 50 cannot discern the operating position to which the shift lever 32 is moved and engine brake traveling reflecting the driver's intention might be impossible. In electronic control devices according to the related art that perform general control, a signal from a position sensor is detected at predetermined intervals, and thus a signal change in a transitional state might not be detected depending on the speed and timing of the driver's operation of the shift lever 32. A shortened processing cycle of the electronic control device, addition of a new position sensor, and the like are conceivable as measures for suppressing such inconveniences. However, these are not preferable because these incur additional costs without exception.

In the shift lever position determination control according to this embodiment, however, the operating position of the shift lever 32 is determined by the use of the signals from two or more of the position sensors 52 with different signal characteristics resulting from a movement of the shift lever 32 in the region where the majority determination is not satisfied in the shift lever position determination control according to the related art. In a case where the majority determination is not satisfied, in particular, it is determined whether the operating position of the shift lever 32 is the M operating position or the N operating position based on a change (reversal) in the magnitude relationship of the signals from the plurality of position sensors 52. Accordingly, the operating position of the shift lever 32 can be appropriately determined as illustrated in FIG. 10B even in the region where the determination of the operating position of the shift lever 32 is difficult in the shift lever position determination control according to the related art. For example, the shift lever 32 is moved between the M operating position and the N operating position during the course of an operation for switching the operating position of the shift lever 32 to the R operating position. When the shift lever 32 reaches the region between the N operating position and the R operating position where the majority determination is not made, the position where the shift lever 32 is present is unclear. When it can be accurately determined that the operating position of the shift lever 32 is on the N operating position side based on the magnitude relationship of the signals from the plurality of position sensors 52 in this case, however, switching of traveling ranges reflecting the driver's intention can be better realized than in a case where it is determined that the operating position of the shift lever 32 is on the M operating position side. In addition, in the shift lever position determination control according to this embodiment, the determination of the operating position of the shift lever 32 in the region where the majority determination is not satisfied in the shift lever position determination control according to the related art can be appropriately performed regardless of the speed and timing of the driver's operation of the shift lever 32. An increase in costs can be suppressed since the processing cycle of the electronic control device does not have to be shortened and no additional position sensor is necessary.

Figure 11:
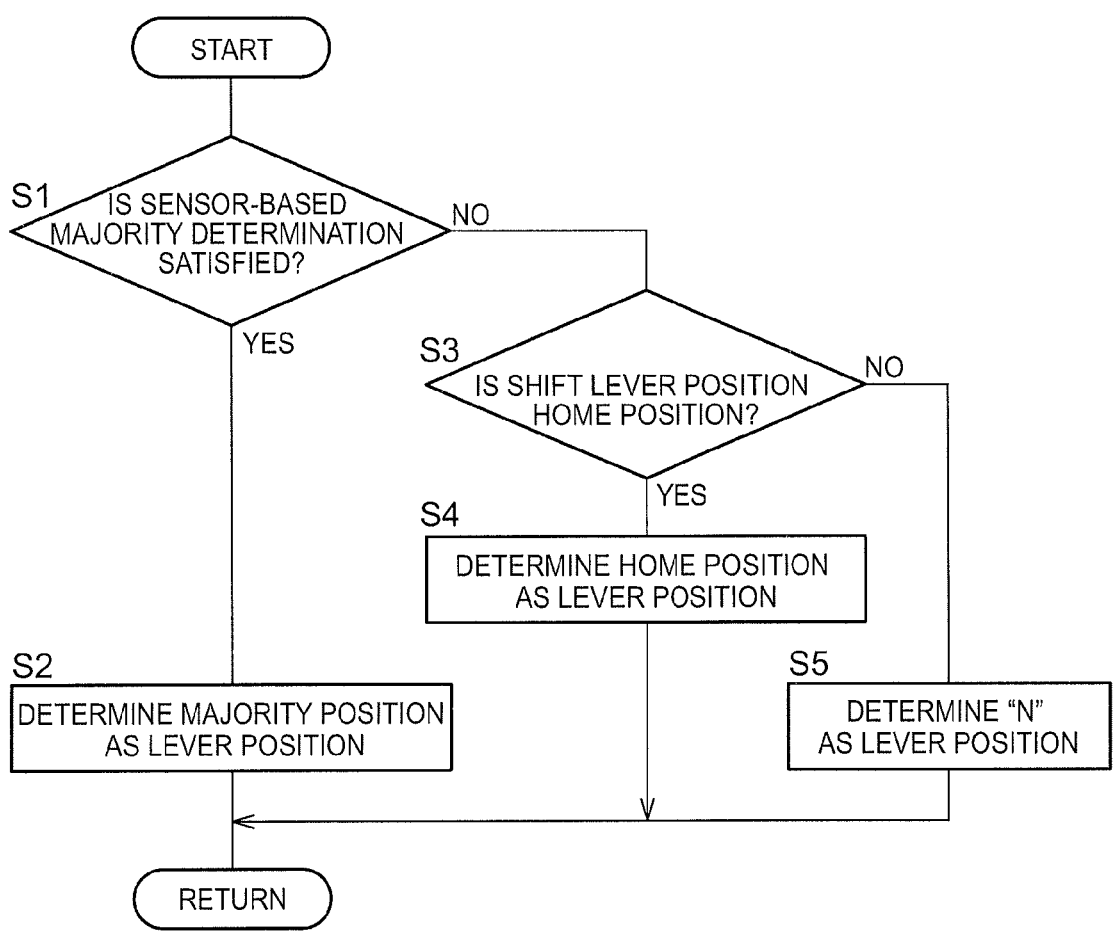
FIG. 11 is a flowchart showing an example of an N operating position determination as a main part of a shift lever operating position determination control operation according to this embodiment.

FIG. 11 is a flowchart showing a main part of a shift lever operating position determination control operation according to this embodiment that is repeatedly executed by the electronic control device 50. The control that is illustrated in FIG. 11 relates to a determination of the N operating position of the shift lever 32 based on a determination on whether the select direction position of the shift lever 32 is on the M operating position side or the N operating position side pertaining to a case where the majority determination is not satisfied during an operation of the shift lever 32 from the M operating position toward the N operating position.

In Step (hereinafter, Step will be omitted) S1, which is the first step illustrated in FIG. 11, it is determined whether or not the majority determination is satisfied with regard to the signals from the plurality of position sensors 52 by the use of a threshold for the N operating position determination. For example, it is determined whether or not the signals from two or more of the position sensors 52 correspond to any of the operating positions. In the case of a positive determination in S1, the operating position corresponding to the signal from the largest number of the position sensors 52, that is, the N operating position of the shift lever 32 is determined in S2 and this routine is terminated. In the case of a negative determination in S1, it is determined in S3 whether or not the operating position of the shift lever 32 is the home position, that is, is on the M position side, by the use of the signals from two or more of the position sensors 52 with different signal change characteristics resulting from the movement of the shift lever 32. For example, it is determined whether or not the operating position of the shift lever 32 is on the M operating position side based on the magnitude relationship of the signals from the two position sensors 52a, 52d. In the case of a positive determination in S3, it is determined in S4 that the operating position of the shift lever 32 is on the M position side. Then, this routine is terminated. It is determined in S5 that the operating position of the shift lever 32 is the N operating position in the case of a negative determination in S3. In the control that is illustrated in FIG. 11, S1 corresponds to the control operation of the majority determination unit 70, S3 corresponds to the control operation of the signal comparison determination unit 74, and S2, S4, and S5 correspond to the control operation of the shift operation position determination unit 72.

According to this embodiment, the shift operation position determination unit 72 performs the majority determination for determining that the single operating position to which more than half of the signals from the plurality of position sensors 52 correspond to is the operating position of the shift lever 32 in a case where those signals correspond to the operating position and can accurately determine whether the operating position of the shift lever 32 is on the M operating position side or the N operating position side based on a change in the magnitude relationship of the signals from the plurality of position sensors 52 in a case where the majority determination is not satisfied. Accordingly, the electronic control device 50 can accurately determine the operating position of the shift lever 32 and allow the traveling range corresponding to the operating position of the shift lever 32 to be satisfied, and thus can realize traveling appropriately reflecting the driver's intention.

The preferred embodiment of the invention has been described in detail with reference to the accompanying drawings. However, the invention is not limited to the embodiment. The invention can also be implemented with various modifications added thereto without departing from the scope of the invention.

For example, the substrate 62 where the plurality of position sensors 52a, 52b, 52c, 52d are arranged may be mounted on an end portion of the shift lever 32 and the magnet 64 may have a fixed position in the frame (not illustrated) of the shift operation device 30 although the plurality of position sensors 52a, 52b, 52c, 52d are arranged on the substrate 62 having a fixed position in the frame (not illustrated) of the shift operation device 30 and the magnet 64 is mounted on the end portion of the shift lever 32 on the substrate 62 side in the embodiment described above.

What is claimed is:

1. A shift lever position determination device for a vehicle, a shift lever selectively operated from a M operating position toward any one of a N operating position, a B operating position, a D operating position, and a R operating position, the shift lever being configured to mechanically return to the M operating position when not operated, the N operating position being disposed at a position adjacent to the M operating position in a select direction, the B operating position being disposed at a position adjacent to the M operating position in a shift direction, the D operating position being disposed at a position adjacent to the N operating position on one side in the shift direction, the R operating position being disposed at a position adjacent to the N operating position on a second side in the shift direction, and the select direction and the shift direction being orthogonal to each other, the shift lever position determination device comprising:

a plurality of position sensors configured to output signals corresponding to the respective operating positions, the signal continuously changing in response to a movement of the shift lever between the respective operating positions, and a magnitude relationship of the signals being reversed as a result of a movement of the shift lever between the M operating position and the N operating position, and an electronic control device configured to perform a majority determination in a case where more than half of the signals from the plurality of position sensors correspond to a same operating position, and configured to determine whether an operating position of the shift lever is in the M operating position or the N operating position in the select direction based on the magnitude relationship of the signals in a case where the majority determination is not satisfied, the electronic control device being configured to determine, in the majority determination, that an operating position corresponding to more than half of the signals is the operating position of the shift lever.

* * * * *